No. 644,198. Patented Feb. 27, 1900.
A. B. DU PONT.
MOTOR SUSPENSION.
(Application filed Aug. 22, 1899.)

(No Model.)

WITNESSES:
S. E. Clarkson
M. E. Sharpe.

INVENTOR
A. B. duPont
BY
Geo. H. Parmelee
his ATTORNEY.

THE NORRIS PETERS CO., PHOTO-LITHO., WASHINGTON, D. C.

UNITED STATES PATENT OFFICE.

ANTOINE B. DU PONT, OF DETROIT, MICHIGAN, ASSIGNOR TO THE LORAIN STEEL COMPANY, OF PENNSYLVANIA.

MOTOR SUSPENSION.

SPECIFICATION forming part of Letters Patent No. 644,198, dated February 27, 1900.

Application filed August 22, 1899. Serial No. 728,071. (No model.)

*To all whom it may concern:*

Be it known that I, ANTOINE B. DU PONT, of Detroit, in the county of Wayne and State of Michigan, have invented a new and useful Improvement in Motor Suspensions, of which the following is a full, clear, and exact description, reference being had to the accompanying drawings, which form a part of this specification.

This invention has relation to motor suspensions for electric vehicles, and is designed to provide means of novel and effective character for elastically supporting the motors on the vehicle-truck independently of the vehicle-body and also of the truck-frame.

The invention also consists in the novel construction and combination of parts, all as hereinafter described, and pointed out in the appended claims, reference being had to the accompanying drawings, in which—

Figure 2:
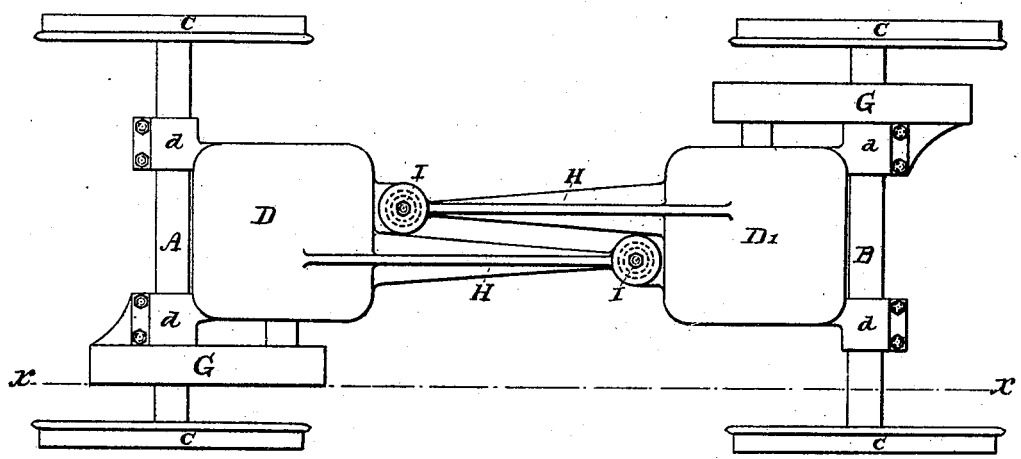
Figure 1:
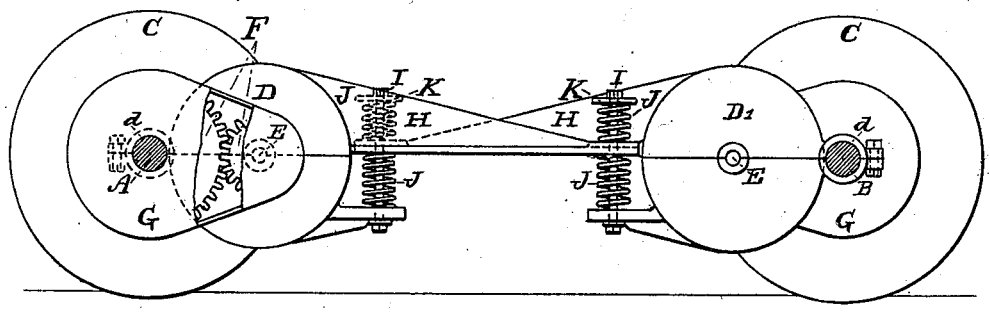

Figure 1 is a sectional side elevation showing one embodiment of my invention, and Fig. 2 is a plan view of the same.

In the drawings the letters A and B represent the two axles of a car-truck, C the wheels, and D D' a pair of electric motors whose casings are sleeved to the axles at *d*. These casings are of the usual sectional construction and contain the field-magnet cores.

E designates the armature-shafts, and F the usual gears which connect said shafts to the respective axles.

G designates the casings which inclose said gears, one of said casings being partially broken away in Fig. 1.

Formed integrally with or rigidly secured to each motor-casing is an arm or projection H, which extends toward the opposite motor, one arm or projection lying beside the other, as clearly shown in Fig. 2, and each at its free end engaging loosely a guide or bolt I, which is supported on the other motor. Coiled around said rods or bolts above and below the arms or projections H are cushion-springs J, provided with suitable end caps K.

Connected in the manner described the two motors are mutually self-supporting at their nose ends, being entirely independent of both the truck-frame and the vehicle-body. They are also perfectly cushioned against movements due to inequalities in track construction and into torque.

It is obvious that various connecting devices embodying the principle of this invention may be employed, the invention being much broader than the specific embodiment which I have shown and described and to which I do not wish to limit myself.

Having thus described my invention, what I claim, and desire to protect by Letters Patent, is—

1. The combination of a pair of electric motors sleeved to opposite axles of the truck and inside the wheel-base, an arm on each motor frame or casing extending toward the opposite motor, and independent springs, one seated on a lug of each motor frame or casing and supporting the arm of the opposite motor.

2. The combination with a pair of electric motors sleeved to opposite axles, of a car-truck within the wheel base thereof, and having each a projecting arm, and a spring seated on a lug of each motor frame or casing, and supporting the arm of the opposite motor.

3. The combination of a pair of motors located inside the wheel-base of a truck and sleeved to opposite axles thereof, each motor having an arm projecting over to the nose of the other motor, and also having a short lug or projection, and a spring seated on each of said lugs or projections and supporting the end of the arm of the opposite motor.

4. The combination of a pair of electric motors located inside the wheel-base of a car-truck and sleeved to opposite axles thereof, the frame or casing of each motor having an integral arm extending therefrom to a point adjacent to the nose of the opposite motor, and also a lug to one side of the said arm, and springs seated on the said lugs and supporting respectively the arms of the opposite motor.

In testimony whereof I have affixed my signature in presence of two witnesses.

ANTOINE B. DU PONT.

Witnesses:
THOS. M. PATTERSON,
WM. C. HOPPER.